(12) United States Patent
Tam

(10) Patent No.: US 8,653,796 B2
(45) Date of Patent: *Feb. 18, 2014

(54) PORTABLE ELECTRONIC DEVICE POWER MANAGER WITH CURRENT LIMIT FEEDBACK CONTROL LOOP MODIFICATION FOR STABILIZING AN EXTERNAL POWER SUPPLY

(71) Applicant: Apple Inc., Cupertino, CA (US)

(72) Inventor: Ching Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/757,033

(22) Filed: Feb. 1, 2013

(65) Prior Publication Data

US 2013/0141035 A1    Jun. 6, 2013

Related U.S. Application Data

(63) Continuation of application No. 12/759,963, filed on Apr. 14, 2010, now Pat. No. 8,368,355.

(51) Int. Cl.
| | |
|---|---|
| *H02J 7/04* | (2006.01) |
| *H02J 7/00* | (2006.01) |
| *H02M 7/537* | (2006.01) |
| *G05F 1/00* | (2006.01) |
| *H02J 9/00* | (2006.01) |

(52) U.S. Cl.
USPC ........... 320/162; 320/128; 363/131; 323/282; 323/284; 307/64

(58) Field of Classification Search
USPC ........... 320/162, 128; 363/131; 323/282, 284; 307/64
See application file for complete search history.

(56) References Cited

U.S. PATENT DOCUMENTS

| | | | | |
|---|---|---|---|---|
| 4,488,057 | A | * 12/1984 | Clarke | ........................... 307/66 |
| 5,465,011 | A | * 11/1995 | Miller et al. | ................... 307/64 |
| 5,689,412 | A | 11/1997 | Chen | |

(Continued)

FOREIGN PATENT DOCUMENTS

| | | |
|---|---|---|
| EP | 0673100 A1 | 9/1995 |
| EP | 1473813 A1 | 11/2004 |
| EP | 2113983 A1 | 11/2009 |

OTHER PUBLICATIONS

PCT Search Report and Written Opinion (dated Mar. 19, 2012), International Application No. PCT/US2011/032157, International Filing Date—Apr. 12, 2011, (12 pages).

(Continued)

*Primary Examiner* — M'Baye Diao
(74) *Attorney, Agent, or Firm* — Blakely, Sokoloff, Taylor & Zafman LLP

(57) ABSTRACT

A portable electronic device has a battery to provide power to operate the device, a connector including a power supply pin to be coupled to an external power supply, and a power manager having a battery charger circuit that draws power through the power supply pin to charge the battery. The power manager has a current limit feedback control loop that limits the drawn current in accordance with a predetermined output current rating of the external power supply. The power manager automatically changes the behavior of its control loop to stabilize operation of the coupled external power supply. Other embodiments are also described and claimed.

20 Claims, 6 Drawing Sheets

(56) References Cited

U.S. PATENT DOCUMENTS

| | | |
|---|---|---|
| 5,723,970 A | 3/1998 | Bell |
| 5,754,414 A | 5/1998 | Hanington |
| 5,959,372 A | 9/1999 | Every |
| 6,104,170 A * | 8/2000 | Lenk et al. ............ 320/163 |
| 6,127,809 A | 10/2000 | Kates et al. |
| 6,664,762 B2 * | 12/2003 | Kutkut ............ 320/116 |
| 6,836,095 B2 | 12/2004 | Fogg |
| 7,359,222 B2 | 4/2008 | Mayell et al. |
| 7,362,594 B2 | 4/2008 | Tsui et al. |
| 7,599,202 B2 * | 10/2009 | Fukumoto ............ 363/131 |
| 7,855,541 B2 * | 12/2010 | Polivka ............ 323/284 |
| 8,035,938 B2 * | 10/2011 | Divan ............ 361/58 |
| 2004/0095115 A1 | 5/2004 | Kernahan et al. |
| 2007/0029975 A1 | 2/2007 | Martin et al. |
| 2007/0132427 A1 | 6/2007 | Veselic |
| 2009/0015209 A1 | 1/2009 | Morina et al. |
| 2009/0115381 A1 | 5/2009 | Zwerver |
| 2010/0079119 A1 * | 4/2010 | Ladurner et al. ............ 323/234 |

OTHER PUBLICATIONS

Non-Final Office Action (dated May 24, 2012), U.S. Appl. No. 12/759,963, filed Apr. 14, 2010, First Named Inventor: Ching Yu John Tam, (14 pages).

PCT International Preliminary Report on Patentability (dated Oct. 26, 2012), International Application No. PCT/US2011/032157, International Filing Date—Apr. 12, 2011.

* cited by examiner

US 8,653,796 B2

PORTABLE ELECTRONIC DEVICE POWER MANAGER WITH CURRENT LIMIT FEEDBACK CONTROL LOOP MODIFICATION FOR STABILIZING AN EXTERNAL POWER SUPPLY

RELATED MATTERS

This application is a continuation of U.S. patent application Ser. No. 12/759,963, filed Apr. 14, 2010, entitled "Portable Electronic Device Power Manager with Current Limit Feedback Control Loop Modification for Stabilizing an External Power Supply", currently pending.

An embodiment of the invention relates to power and/or signal conditioning techniques in a portable electronic device to automatically stabilize a coupled, external power supply.

BACKGROUND

Many portable electronic devices such as handheld wireless communications devices (mobile phones or smart phones) and notebook or laptop personal computers have built-in, switching power supply circuits that are powered by an external power source. For instance, when an AC power adapter having a regulated output is plugged into a smart phone, a switching power supply circuit in the smart phone draws current from the plugged-in power adapter, and produces the needed voltage for charging the device's battery and for operating the rest of the components of the device. The way in which the switching power supply circuit draws current, however, creates a negative impedance load. As a result, the external power source sometimes behaves abnormally, e.g. its normally stable dc output drops out of regulation, exhibits excessive undershoot and overshoot, and may even oscillate.

SUMMARY

An embodiment of the invention is a portable electronic device having a battery to provide power to operate the device and a connector including a power supply pin to be coupled to an external power supply. The device also has a power manager circuit. The power manager draws power through the power supply pin from the coupled external power supply, to charge the battery (e.g., using a switching power supply circuit). The power manager has a current limit feedback control loop that limits the drawn current in accordance with a predetermined output current rating of the external power supply (e.g., by controlling a series pass transistor). The power manager automatically changes the behavior of the feedback control loop to help stabilize operation of the coupled external power supply.

The power manager may change behavior of the control loop by modifying its loop frequency response.

The power manager may also change the behavior of the control loop by changing a bias current of an error amplifier used in the control loop, e.g. to either increase or decrease bandwidth of the control loop.

The power manager may also change the frequency response of a filter in the control loop to change a resonant frequency of the control loop. This filter may be a control signal filter, e.g. a digital filter, or it may be a power line conditioning filter.

In another embodiment, the power manager can signal that a predetermined impulse-type load be applied on the power supply pin. The response of the coupled external power supply to the impulse-type load is then measured, and on that basis the behavior of the control loop can be changed. For example, the power manager can calculate a resonant frequency of the coupled external power supply based on the measured response, and on that basis changes the behavior of the control loop, e.g. by changing bandwidth of the control loop to avoid the calculated resonant frequency.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

As summarized above, an embodiment of the invention is a technique that may help stabilize an external power supply that is coupled to a portable device, by modifying the behavior of a current limit control loop in the device, but without actually impairing its current limiting function. For a better perspective of the invention, consider the following, different technique that can also help stabilize an external power supply. The voltage spectrum (above dc and in a predetermined frequency range of interest) at the input of a switching power supply circuit in the portable device (and which is fed by the external power supply) is monitored. While doing, so the current spectrum being drawn from the external power supply is adjusted so that the load presented to the external power supply becomes a positive impedance (or a linear one). In some cases, however, this linearization of the load is not sufficient to stabilize the external power supply, particularly where the latter may be a switch mode (switching) voltage regulator. An embodiment of the invention is a different adjustment that can be made in the portable device, which may be used by itself or in combination with load linearization, to help stabilize the external power supply.

Figure 1:
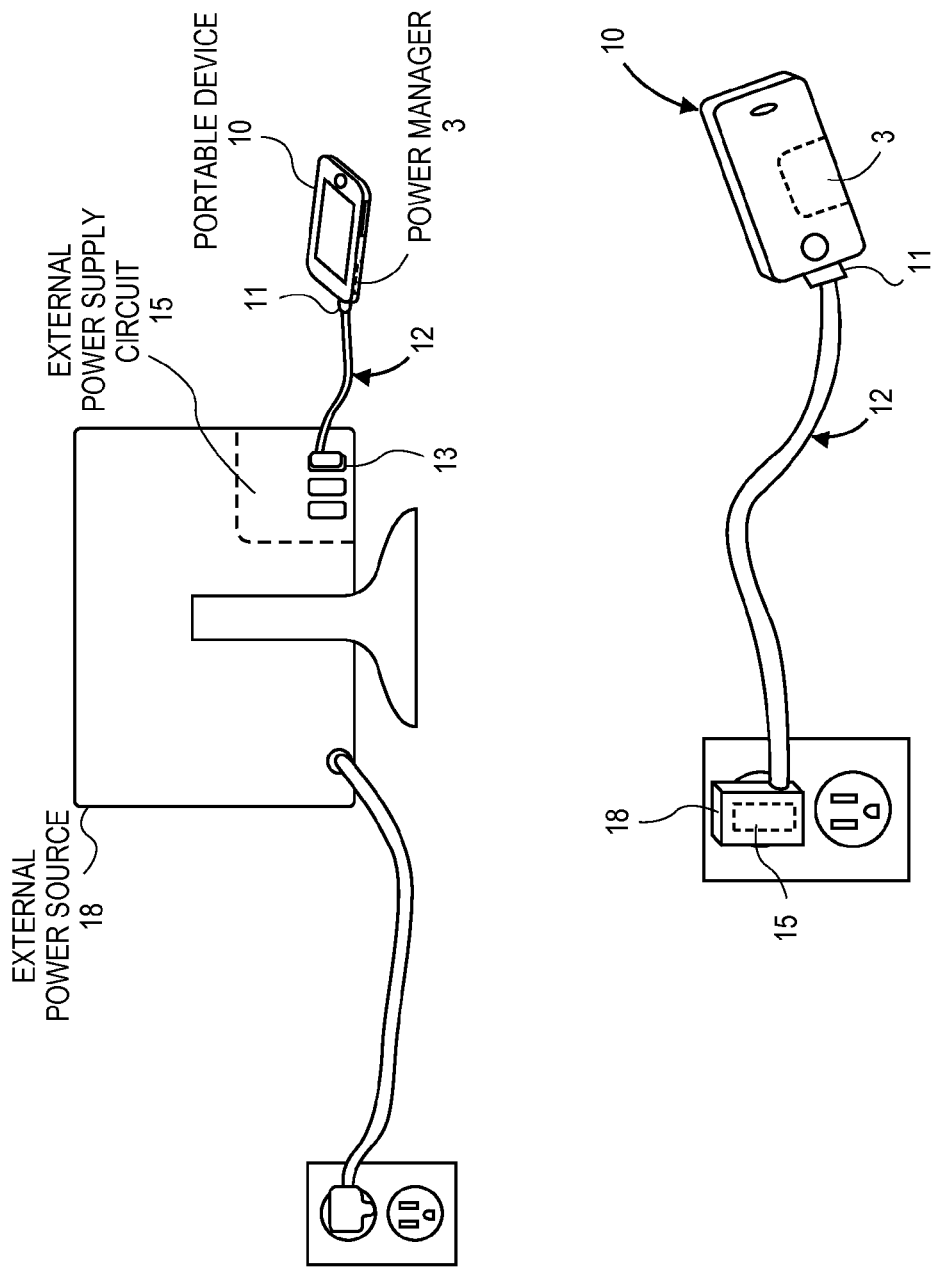
FIG. 1 shows two scenarios of a portable device coupled to an external power source.

FIG. 1 shows several different scenarios of a portable device (PD) 10 coupled to an external power source (EPS) 18, for purposes of charging a battery (not shown) of the PD. The term "battery" here is used generically to include not just conventional electro-chemical cell systems but also fuel cell systems suitable for use in the PD 10. The PD 10 is a battery-operated, consumer electronics device that can be easily carried around by its user in one hand. It may provide one or more of the following electronic functions to its user: two-way real-time or live wireless communications (referred to generically as mobile audio or video telephony); messaging; Web browsing and Web-based services; navigation; compass; calendar application; still and video camera; digital photography application; word processor application; spreadsheet application; group presentation application; audio and video recording; digital media player including audio and video; and video games. The PD 10 has a housing in which are integrated its various electronic circuit components which are well known to those of ordinary skill in the art as being needed to provide any one or more of the above functions.

In FIG. 1, two instances of the PD 10 are shown. In one instance, the PD 10 is coupled to a desktop personal computer through a peripheral communications interface cable assembly 12. The desktop computer may be powered by being plugged into an AC wall outlet, as shown. In another instance, the PD 10 is coupled to the EPS 18 being an AC wall power adapter unit. In yet another instance (not shown), the EPS 18 may be a cigarette lighter/automobile voltage adapter unit or a laptop/notebook computer.

In one instance, the cable assembly 12 has a PD-side cable connector 11 that is designed to mate with a built-in connector of the PD 10 (not shown), in addition to an EPS-side cable connector 13. The latter would be pluggable with a mating connector built into the EPS 18. The cable assembly 12 may, for example, be in accordance with a computer peripheral communications interface specification, such as Universal Serial Bus (USB) or other suitable alternative for communications with a peripheral device. The communications interface may also be referred to as a communications bus. Note that in another instance, the cable assembly 12, while having the PD-side connector 11, has no corresponding EPS-side connector 13. In that case, the wires of the cable assembly 12 may be hardwired into circuitry inside a housing of the EPS 18.

In the EPS 18, there is an EPS power supply circuit 15 (also referred to here as the external power supply 15). The external power supply 15 may be a switch mode voltage regulator that provides a regulated dc output voltage. This may be obtained using an AC to DC converter in the case of an AC wall adapter unit, or a DC to DC converter in the case of a cigarette lighter adapter or a desktop personal computer, depending on the type of input power.

In the PD 10, there is integrated therein a power manager circuit 3 which is responsible for adjusting the amount of power that is consumed in the PD 10 (and which may be drawn from the external power supply 15) in order to make more efficient use of the power to conserve battery energy and avoid thermal situations. For instance, the power manager may perform a combination of one or more of the following control functions: backlighting of a display screen; hard disk spin down; sleep and wake; battery charging; trackpad control, input/output during sleep; and other functions of the PD 10 that have substantial impact on power consumption. These may be based on algorithms that are executed by a data processing component of the power manager 3, e.g. a microcontroller. The power manager 3 may also be viewed as including power supply circuitry (both control and power components), such as any one or more of the following: a battery charger circuit; a dc-dc switching and/or linear voltage regulator; and a boost converter. The power manager 3 may also include sensor circuitry, including an A/D converter, to help it perform functions such as temperature regulation and thermal management, by adjusting the power consumption of a component in the PD 10 in response to sensing temperature in the PD 10.

In one embodiment, the power manager 3 has switching power supply circuitry that draws power from the external power supply 15, through in this case a power (P) pin or power supply line of the connector 11, and charges the battery—essentially operating as a switch mode battery charging circuit. The power manager 3 may also have the additional function of drawing power from the external power supply 15 to power (operate) essentially the rest of the components of the PD 10. This may be achieved using either one or more linear or switch mode, regulating power supply circuits, whose outputs supply power to all other components in the PD 10 (e.g., main logic board, display screen, touch screen, track pad, hard disk drive, RF power amplifiers, etc.). The power manager 3 may be a packaged integrated circuit (chip), a multi-chip module, or a combination of several packaged integrated circuits and discrete devices, installed on a printed wiring board inside a main housing of the PD 10.

Figure 2:
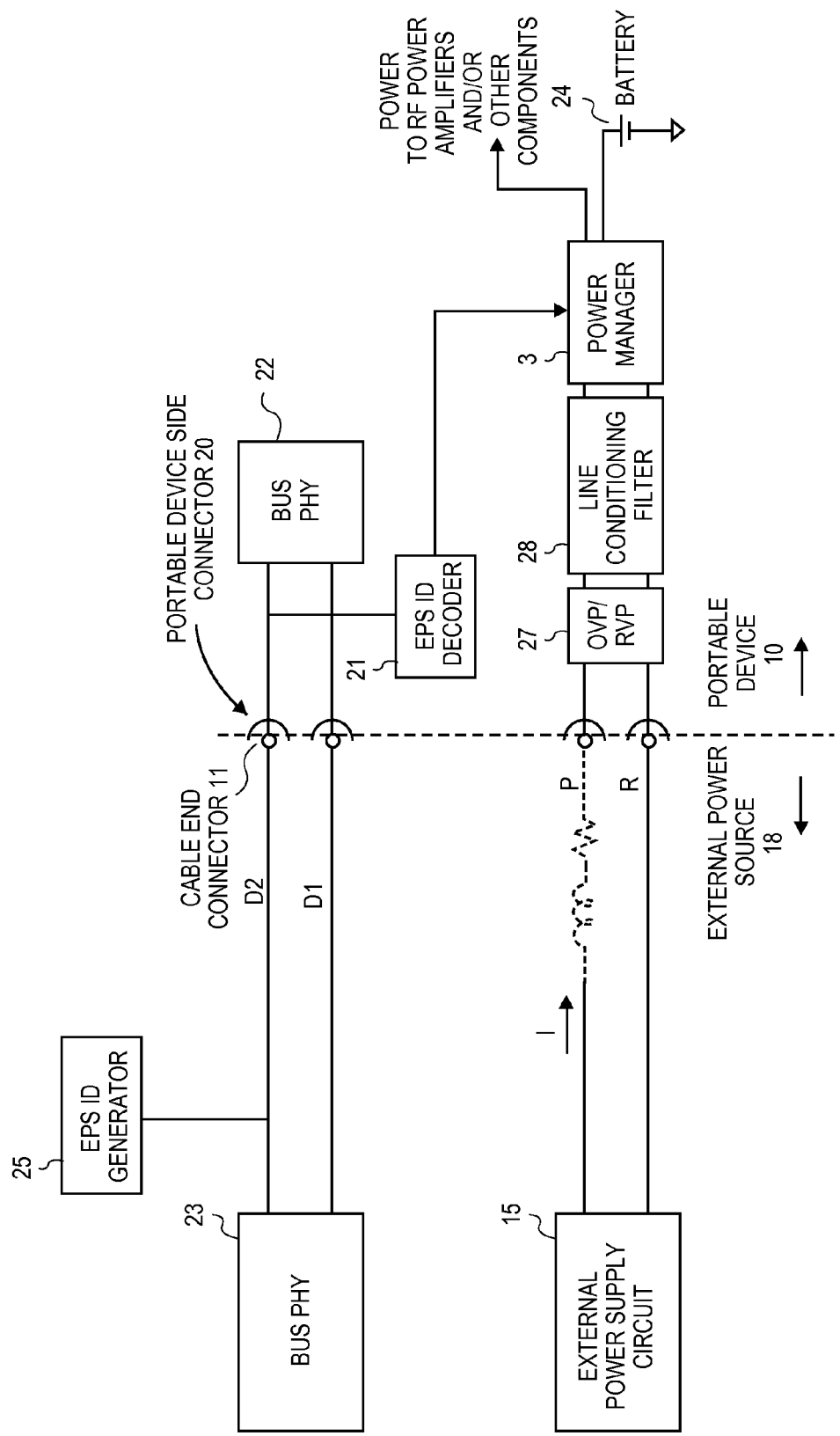
FIG. 2 is a circuit schematic of the external power source and the portable device as they are coupled to each other, including certain relevant components of each.

Turning now to FIG. 2, a circuit schematic of the EPS 18 and the PD 10 as they are coupled to each other is shown, including certain relevant components of each. The cable end connector 11 is used to separate, for purposes of this discussion, the portable device side from the external power source (EPS) side as shown. The connector 11 mates with a PD-side connector 20 that has at least one data pin (in this example, a pair of data pins D1, D2) and a pair of power (P) and return (R) pins. The latter pair is used primarily for supplying power to the PD 10, while the data pins are used primarily for conducting signaling information and data transfer. The signaling and data transfer is conducted by a bus phy 23 in the EPS side, and a corresponding bus phy 22 in the PD-side. A bus phy is the physical layer interface of a given communication bus that is used to connect the EPS and the PD. For example, the bus phy may be in accordance with any existing communications bus specification, e.g. USB or other suitable alternative for peripheral device communications in consumer electronics devices.

In this example, the EPS side also contains an EPS identification generator 25 which may be separate from the bus phy 23. The EPS identification generator 25 allows the manufacturer of the EPS 18 to identify various attributes of the EPS 18, including its type or model, serial number, and/or certain characteristics of its external power supply 15 such as its power supply output power, current, and/or voltage rating (on the P and R lines). The latter information can be signaled on a data line D1 or D2 of the communications bus, which is then recognized by an EPS identification decoder 21 on the PD-side and then used by the power manager 3, to determine how to manage power consumption in the PD. In particular, the power manager 3 may use the recognized, external power supply output ratings to limit the drawn current or power on the power line, as well as monitor the state of the voltage on the power line as described below to stabilize operation of the external power supply. Any conventional technique for transferring power supply attributes between the EPS identification generator 25 and the EPS identification decoder 21 may be used, including an analog signaling approach in which known pull up or pull down resistors on a data line (whose resistance values are associated with respective power or current limits) are selected and set in the generator 25, which are then detected in the decoder 21.

Note that for the sake of convenience, any reference here to an "output current rating" of the external power supply 15 should be understood as alternatively being an "output power rating", since the two are related by the relationship Power=current*voltage.

The power manager 3 contains a battery charger circuit that draws power through the power supply pin (P) to charge a battery 24. In this example, the power manager 3 draws the current through an over voltage protection/reverse voltage protection (OVP/RVP) circuit 27, and a power supply line conditioning filter (LC) 28. The OVP/RVP 27 prevents the voltage at its output from exceeding a predetermined limit (e.g., due to an electrostatic discharge event or a reversal of polarity). The LC filter 28 includes one or more analog filter components, e.g. a series pass inductor and shunt capacitor, that perform a low pass filtering function on the power supply line, prior to input to the power manager 3. The drawn power may also be used to operate all other components of the PD 10, including main logic board, RF power amplifiers, display screen, etc. The power manager 3 manages the amount of current allocated to charge the battery 24 and to the rest of the components in the PD 10, so as to not exceed the predetermined output rating of the external power supply 15 (as determined by the EPS Identification decoder 21). This is performed using a current limit feedback control loop. To help stabilize operation of the coupled EPS 15, the power manager 3 automatically changes the behavior of its current limit feedback control loop. These aspects are explained in detail below.

Figure 3:
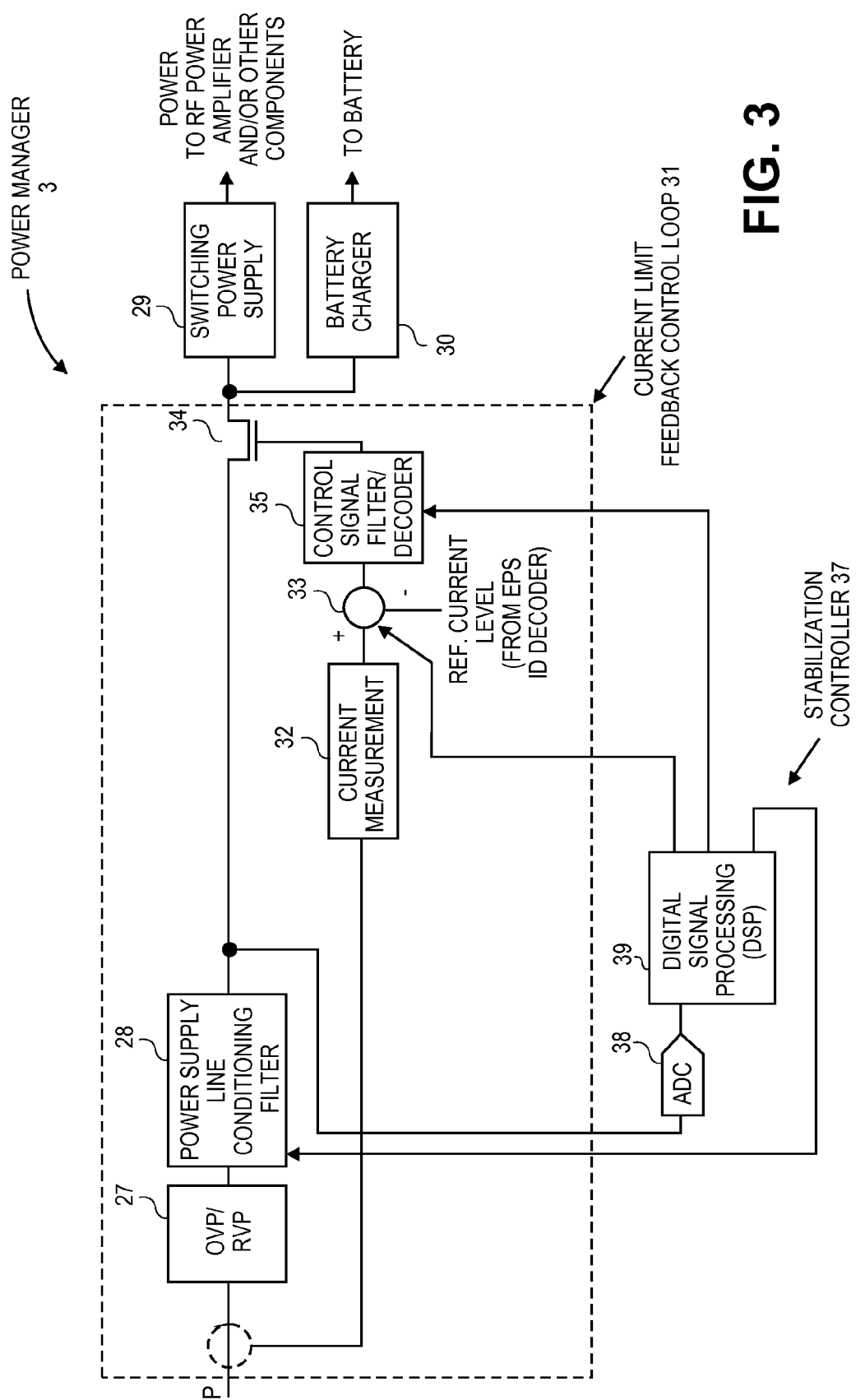
FIG. 3 is a combined circuit schematic and block diagram of a power manager for the portable device, in which one instance of the current limit feedback control loop is shown as being adjusted or controlled in accordance with an embodiment of the invention.

Turning now to FIG. 3, a combined circuit schematic and block diagram of the power manager 3 is shown, in which one instance of a current limit feedback control loop 31 is depicted. In this case, the power drawn through the line conditioning filter 28 passes through a series pass transistor 34, before being split between a battery charger 30 and a switching power supply 29. The latter may be used to power an RF power amplifier and/or other components of the PD 10 (including, for example, all components other than the battery), while the battery charger 30, which may be a linear or switch mode type of charger, is responsible for bringing the battery up to a state of full charge.

In addition to the series pass transistor, the current limit feedback control loop 31 also includes a current measurement circuit 32 that obtains a measure of the current in the power supply line (which feeds the power manager and its control loop 31). This may be a measure of the dc current at a given instant, which is then repeated over time as the PD 10 operates with the coupled external power supply 15 (see FIG. 2). The measured dc current may be sensed, or it may be estimated through a calculation. For instance, the current may be sensed by obtaining the voltage across a series pass resistor, or it may be sensed by using a magnetic current loop placed around the power supply line. As an alternative, the current measurement circuit 32 it may be signaled the measure of current by the external power source 18 itself (e.g., using EPS identification generator 25 and over the data lines D1, D2—see FIG. 2). In any case, the measured current is compared by a comparator circuit 33 to a reference current level. The latter may have been previously recognized by the EPS identification decoder 21 (see FIG. 2), as a predetermined output current rating of the external power supply or derived from a power rating. The predetermined output current rating may be a specified, maximum steady state current or power (that can be indicated by the external power supply). The error or difference between the measured current and the reference current is then filtered or decoded by a control signal filter/decoder circuit 35, before being used to drive a control electrode of the series pass transistor 34. The current limit feedback control loop 31 periodically samples the current on the power supply line and in response adjusts the series pass transistor 34 to ensure that the predetermined output rating is not exceeded. This technique may allow the battery charger 30 and the switching power supply 29 to operate independently of the current limit feedback control loop 31. In contrast, as explained below with reference to FIGS. 4 and 5, there are other embodiments of the invention in which the battery charger 30 and/or the switching power supply 29 are not independent of the current limit control loop, but rather themselves respond to control signals from the filter/decoder 35, in order to limit the overall dc current on the power supply line.

Viewed another way, the control loop 31 is a closed feedback control loop in that it continuously monitors the dc current in the power supply line and, as defined by the frequency response or input/output characteristics of the filter/decoder 35, modulates the pass transistor 34, so as to maintain the highest voltage possible downstream of the pass transistor 34 while at the same time not exceeding the output current rating of the external power supply.

In accordance with an embodiment of the invention, the "normal" behavior of the current limit feedback control loop 31 is adjusted or modified by a stabilization controller 37 acting in real-time or continuously, in order to help stabilize the external power supply. In one embodiment, as depicted in FIG. 3, this is done using a digital signal processing (DSP) circuit 39 performing an algorithm that takes as input the measured voltage spectrum on the power supply line (in this case, using an analog to digital converter (ADC) 38 to digitize the power supply line voltage downstream of the line conditioning filter 28 and before or upstream of the battery charger 30 and switching power supply 29). The DSP circuit 39 analyzes the voltage in real-time, and on that basis immediately changes the behavior of the control loop 31 in response to learning, for instance, that the external power supply is operating outside of its voltage specification. For example, the dc voltage on the power supply line may be exhibiting oscillations, transients (over shoots and under shoots), and/or over voltage or under voltage (that is, the steady state dc voltage is outside its regulated range).

Viewed another way, the power manager and in particular the controller 37, monitors the voltage of the power supply line, to find any indication that the coupled external power supply is operating abnormally or in an unstable manner. In response to detecting such an event, the controller 37 changes the behavior of the control loop 31 by modifying its loop frequency response. This may be done, for example, by changing a bias current of an error amplifier that is part of the comparator 33 (see FIG. 3). The signaling of this change in the bias current may be designed to increase or decrease the bandwidth of the control loop 31, that is the speed at which the control loop responds to changes in the monitored power supply line voltage. Thus, the comparator 33 may include such an error amplifier, whose variable bias current can be increased or decreased so as to change the loop bandwidth. It is expected that by changing the loop bandwidth in this manner, the effective AC load presented to the external power supply is modified so as to make the AC load appear more palatable to the regulation circuit of the external power supply. As suggested above, this change to the current limit feedback control loop's frequency response may be used in conjunction with other techniques known in the art that attempt to linearize the AC load presented to the external power supply.

Another "knob" that can be turned in the current limit feedback control loop 31 (to help stabilize the external power supply) is the frequency response of the control signal filter decoder 35. The filter decoder 35, which may be an analog or a digital band pass filter depending upon the implementation, has a frequency response that can be altered by the controller 37, so as to change the resonant frequency of the control loop 31. The filter 35 lies in a control signal path of the loop 31, such that modifying the taps or coefficients of its digital filter results in a change in the resonant frequency of the overall loop 31. The change in the resonant frequency is designed to avoid a resonant frequency of the coupled external power supply. By forcing a difference between the resonant frequency of the control loop 31 and that of the external power supply, the likelihood of a potentially unstable voltage signal being generated (e.g., an oscillation; an overshoot or undershoot) on the power supply line is reduced.

Yet another way in which the resonant frequency of the control loop 31 can be changed (so as to distance it from the resonant frequency of the external power supply) is to alter the frequency response of the power supply line conditioning filter 28. Thus, in one embodiment, the controller 37 has an output that controls a parameter or characteristic of the line conditioning filter 28 so as to alter the latter's frequency response (yet maintaining its overall low pass filtering or ripple reducing function), in a way that changes the resonant frequency of the control loop 31 (to avoid that of the external power supply).

In view of the above, an embodiment of the invention may be a machine-readable medium such as integrated circuit memory or mass storage (inside the portable device) having stored thereon instructions, which program one or more data processing components (generically referred to here as a "processor") to perform some of the operations of the DSP circuit 39 described above. In other embodiments, some of these operations might be performed by specific hardware components that contain hardwired logic. Those operations might alternatively be performed by any combination of programmed data processing components and fixed hardwired circuit components.

Figure 4:
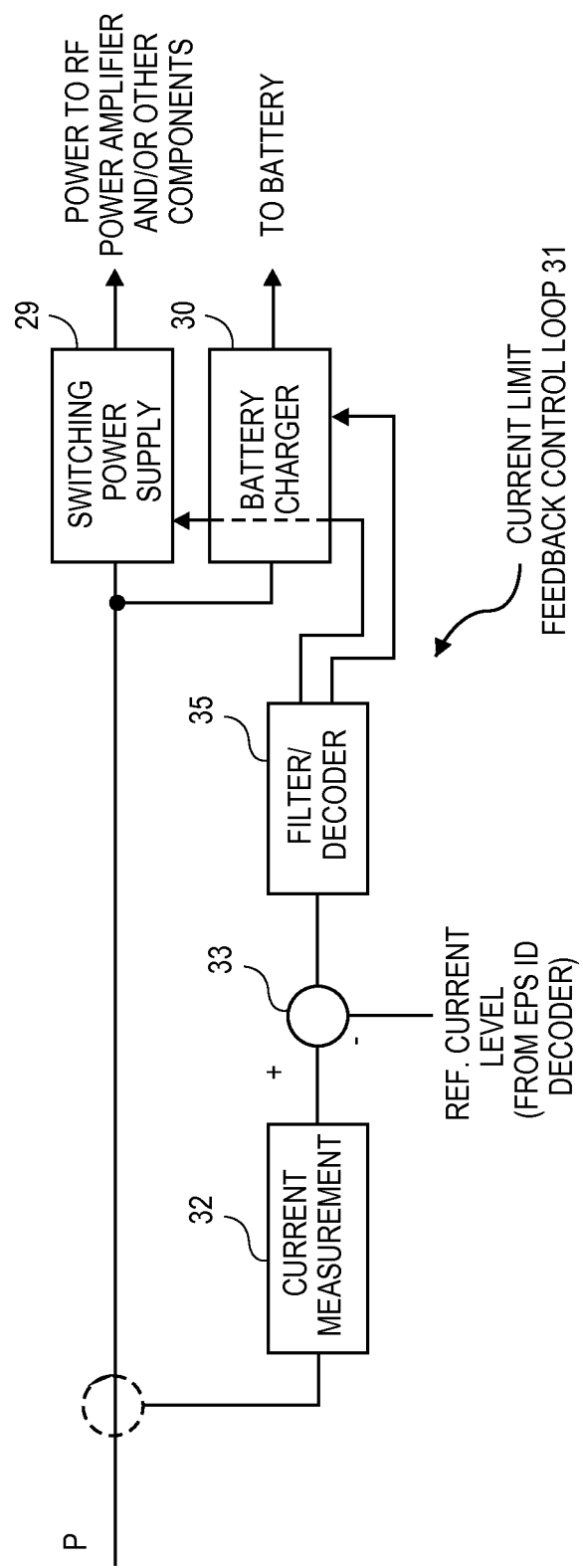
FIG. 4 is a combined circuit schematic and block diagram of another instance of the current limit feedback control loop.

Referring now to FIG. 4, a combined circuit schematic and block diagram of another instance of the current limit feedback control loop 31 is depicted. In this embodiment, the current measurement circuit 32, comparator 33, and filter/decoder 35 may operate in much the same way as in the case of FIG. 3, except that there is no separate series pass transistor 34 on the power supply line (upstream of the battery charger 30 and switching power supply 29). Rather, the current limiting is achieved in this case by directly controlling the power supply circuits that are on the power supply line, in this case the battery charger 30 and the switching power supply 29, so that the total dc current drawn on the power supply line remains at or below the reference current level. Here, the filter/decoder 35 has an output that provides a control signal to the battery charger 30 which indicates that, for example, the battery charge current should be reduced (to ensure that the total current on the power supply line does not exceed the predetermined threshold). Similarly, the filter/decoder 35 could in another instance signal the switching power supply 29 to reduce its draw of the total current on the power supply line (e.g., in favor of allowing the battery charger 30 to draw more current so as to, for instance, charge the battery more quickly). Such decisions can be made by the filter/decoder 35 in accordance with conventional, portable device power management techniques. The rest of the power manager that is depicted in FIG. 3, namely the controller 37 (having ADC 38 and DSP circuit 39) which is acting to adjust the current limit feedback control loop 31, is not repeated in FIG. 4 in the interest of conciseness, but is understood to be present, to provide the needed adjustments in order to stabilize the external power supply.

Figure 5:
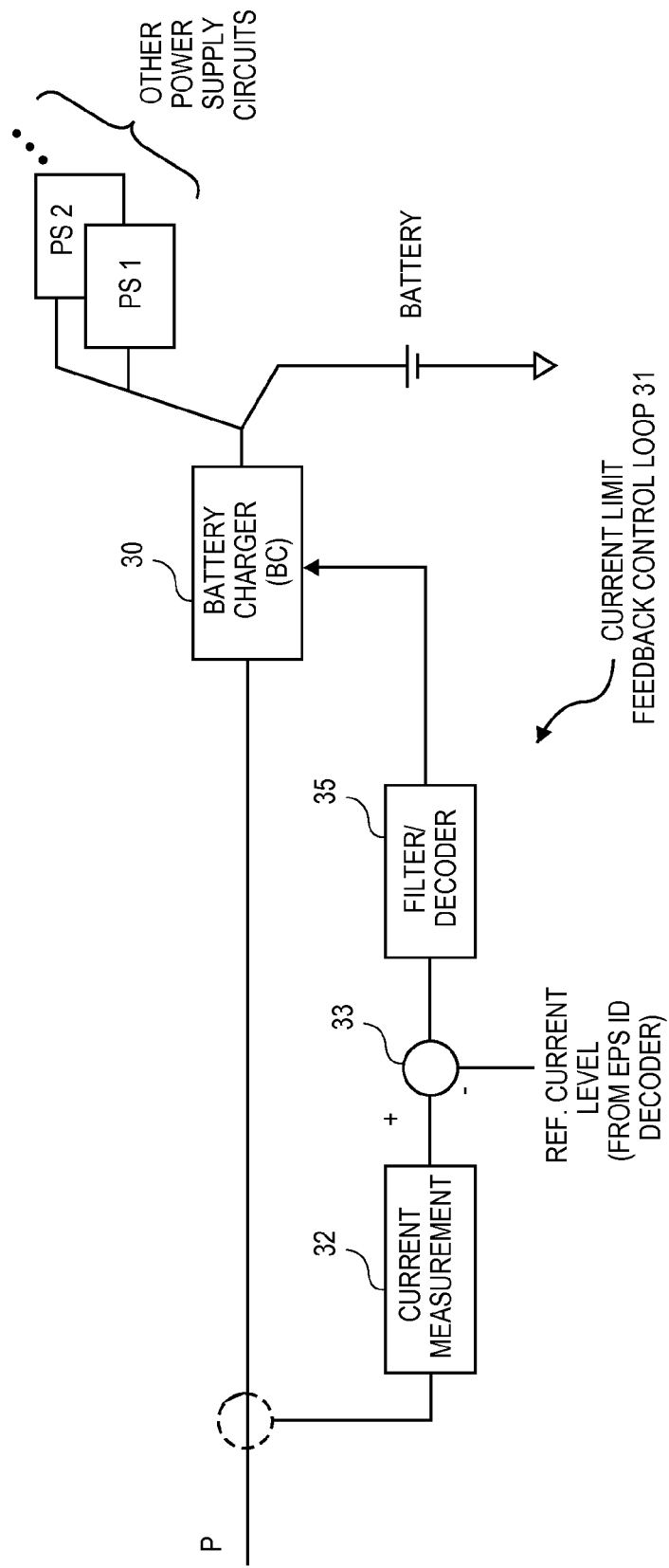
FIG. 5 is a combined circuit schematic and block diagram of yet another instance of the current limit feedback control loop.

FIG. 5 depicts a combined circuit schematic and block diagram of yet another instance of the current limit feedback control loop 31. In this case, the power supply line terminates only in the battery charger 30, such that the other power supply circuits PS 1, PS 2, etc. in the portable device are dc coupled to the positive node of the battery charger 30 that supplies current to recharge the battery. In contrast, the arrangement of FIG. 3 would require additional power switching circuitry (downstream of the battery charger) that directly couples the positive node of the battery to all other power supply circuits of the portable device. Returning to FIG. 5, the current limit feedback control loop 31 in this embodiment operates in general similar to the others, except that once again there is no requirement for a series pass transistor 34 (see FIG. 3) separate from the battery charger 30 itself. The output of the filter/decoder 35 provides a control signal that commands the battery charger 30 to limit the amount of current it draws on the power supply line. Again, this control signal is based on the filter/decoder 35 having determined that a maximum specified dc current has been reached on the power supply line.

Figure 6:
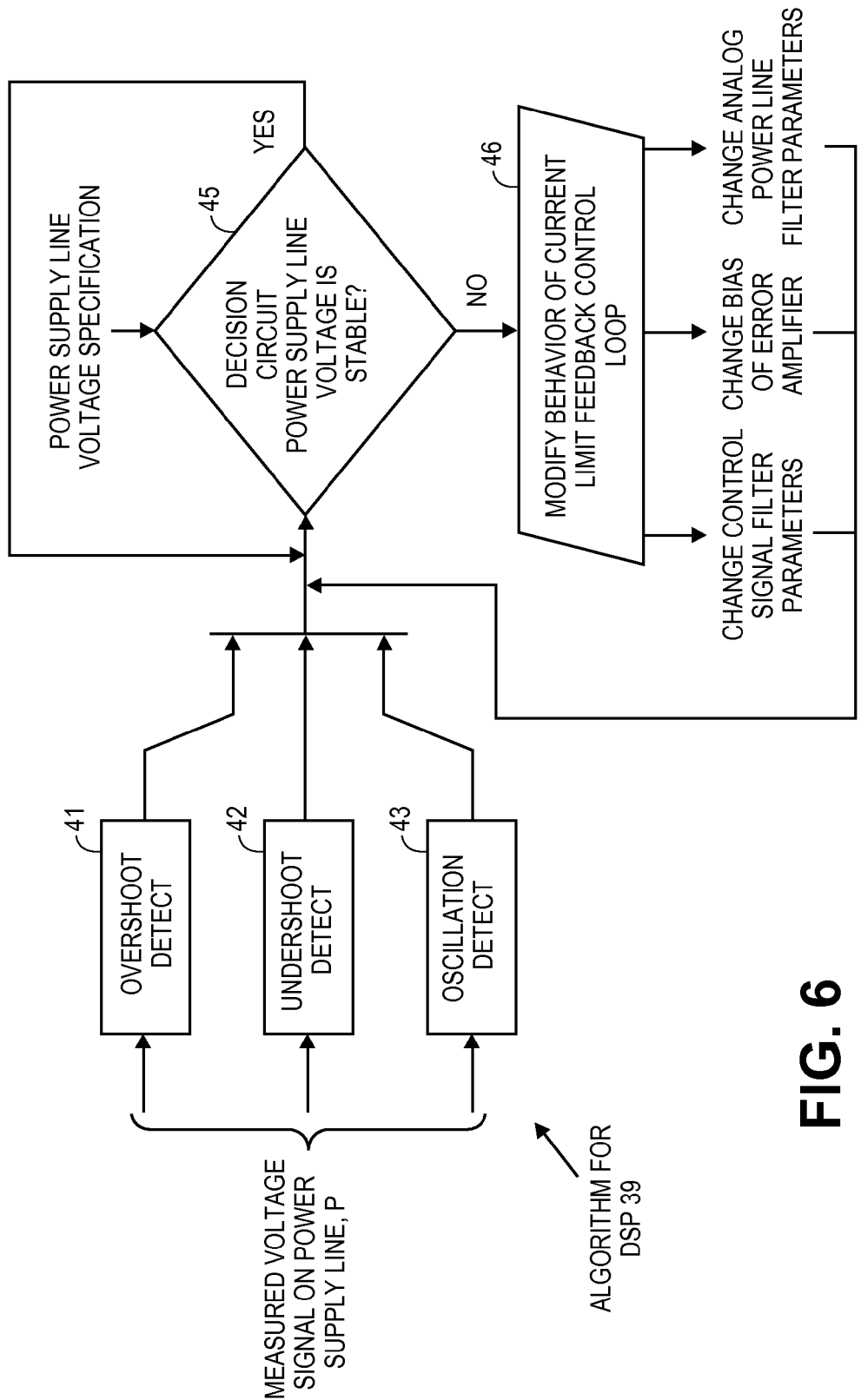
FIG. 6 is an example algorithm for digital signal processing to adjust the current limit feedback control loop.

Referring now to FIG. 6, an example algorithm for the DSP circuit 39 to adjust the current limit feedback control loop 31 is depicted. The algorithm has at least two inputs, namely the measured voltage signal on the power supply line (P), and a power supply line voltage specification. The latter may be read from or transmitted by the coupled external power supply, or it may have been previously programmed or stored into the portable device at the time of the latter's manufacture. The algorithm includes a decision circuit 45, which determines whether the power supply line voltage is stable. This may include simply determining whether a measured dc voltage signal is within a regulated dc voltage range of the specification. The decision circuit 45 may alternatively obtain input from several other blocks that analyze a measured AC voltage signal, namely an overshoot detect block 41, an undershoot detect block 42, and an oscillation detect block 43. As their names imply, these blocks may perform digital signal processing upon the measured voltage signal and in particular the AC voltage spectrum (over a given frequency range of expected operation) to detect an overshoot situation, an undershoot situation, or an oscillation of sufficiently high magnitude. If any of these "problems" are detected, the power supply line voltage is deemed unstable, in response to which the algorithm modifies the behavior of the current limit feedback control loop (block 46). Here again, the algorithm may taken one or more of the following options to address the encountered problem: change one or more parameters of the control signal filter/decoder 35; change the bias of the error amplifier in the comparator 33; and/or change one or more parameters of the analog power supply line conditioning filter 28 (see FIG. 3). As explained above, this modification to the control loop process may be viewed as changing the loop frequency response, without affecting the dc current limiting function of the current limit feedback control loop. The change in the behavior of the control loop may also be viewed as changing the loop bandwidth of the feedback control loop process. Note that such changes may be defined to be relatively small increments, so that the overall dc current limiting function of the control loop is not substantially impaired. Due to the real-time or continuously operating nature of the algorithm, forcing small changes in this manner may be effective in yielding only the minimum change in behavior that is needed, in order to remove the detected instability on the power supply line voltage.

The above-described process for the controller 37 to adjust or modify the behavior of the current limit feedback control loop process may operate "in the background", that is continuously during normal operation of the portable device and being inconspicuous to the end user of the device. In some cases, however, it may be desirable to make relatively infrequent changes to the control loop process, or to anticipate a potential instability on the power supply line. This could be achieved by first stimulating the external power supply in order to elicit a response from it (a voltage response on the power supply line), to obtain information about the potential for instability on the power supply line. For example, the stabilization controller 37 may be capable of signaling the battery charger 30 and the switching power supply 29 (see FIG. 3) to apply a predetermined load on the power supply line, so as to elicit a response from the external power supply. This predetermined load may be an impulse-type load, such as one typically used to measure the response of a conventional voltage regulator circuit. The controller 37 will then measure the response in the manner described previously (including, for instance, taking a measure of the AC voltage spectrum on the power supply line) and then analyzes the measured response to determine a characteristic of the external power supply. In particular, the controller 37 may use the measured response data to calculate a resonant frequency of the external power supply, by, for instance, detecting the frequency of oscillations observed in the measured response. The controller 37 then modifies the control loop 31 based on the analyzed response. For instance, the controller 37 may change the loop bandwidth of the control loop 31 to avoid the calculated resonant frequency. This capability of stimulating the external power supply and measuring its response may be a stand-alone algorithm for the DSP circuit 39, or it may be added to the algorithm depicted in FIG. 6 to be performed, for example, only occasionally, so as to verify a previous modification made to the current limit feedback control loop process.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 3 shows how the current limit feedback control loop 31 is adjusted by a DSP circuit 39 that monitors a digitized version of the power supply line voltage, this could alternatively be achieved using a purely analog monitoring and control circuit (for the controller 37). Also, although the PD 10 depicted in FIG. 1 is a multi-function mobile phone (smart phone), the invention is applicable to other types of portable device, e.g. laptop/notebook computers, tablet computers, dedicated navigation devices, digital media players, cellular phones, and personal digital assistants. The description is thus to be regarded as illustrative instead of limiting.

What is claimed is:

1. A portable electronic device comprising:
a battery to provide power to operate the device;
a connector including a power supply pin to be coupled to an external power supply; and
a power manager having a battery charger circuit that draws current through the power supply, pin to charge the battery,
the power manager having a current limit feedback control loop that limits the drawn current in accordance with a predetermined output current rating of the external power supply,
the power manager to automatically modify loop frequency response of the control loop in response to monitoring voltage of the power supply pin to stabilize operation of the coupled external power supply.

2. The portable device of claim 1 wherein the power manager is to modify the loop frequency response of the control loop in response to learning that the external power supply is operating outside of its voltage specification.

3. The portable device of claim 1, wherein the power manager is to modify the loop frequency response in response to the monitored voltage indicating that the coupled external power supply is operating abnormally.

4. The portable device of claim 1 wherein the power manager is to modify the loop frequency response by changing a bias current of an error amplifier to one of increase and decrease bandwidth of the control loop.

5. The portable device of claim 1 wherein the power manager is to modify the loop frequency response by changing the frequency response of a filter to change a resonant frequency of the control loop, the filter being one of a control signal filter and a power line conditioning filter.

6. The portable device of claim 1 wherein the power manager is to signal that a predetermined impulse-type load be applied on the power supply pin, measure response of the coupled external power supply to the impulse-type load, and on that basis modify the loop frequency response of the control loop.

7. The portable device of claim 6 wherein the power manager is to calculate a resonant frequency of the coupled external power supply based on the measured response, and on that basis modify the loop frequency response of the control loop.

8. The portable device of claim 7 wherein the power manager is to modify the loop frequency response of the control loop by changing bandwidth of the control loop to avoid the calculated resonant frequency.

9. A power manager circuit comprising:
means for limiting dc current drawn from a power supply line so as not to exceed a specified maximum steady state current for the power supply line;
means for charging a battery using the drawn current;
means for monitoring voltage of the power supply line while drawing said current; and
means for changing loop frequency response of the current limiting means in response to the power supply line voltage moving outside of a predetermined range.

10. A method for controlling a current limit feedback control loop process in a portable electronic device, comprising:
measuring power supply current and voltage in a portable electronic device, wherein the power supply current and voltage are being sourced from an external power supply that is coupled to the portable electronic device;
comparing the measured power supply current to a threshold;

adjusting the power supply current based on the comparison, wherein the measuring, comparing and adjusting are part of a current limit feedback control loop process;

analyzing the measured power supply voltage to determine whether or not the external power supply is operating outside of its specification; and modifying loop frequency response of the control loop process based on the analysis.

11. The method of claim 10 further comprising:

applying a predetermined load to the coupled external power supply to elicit a response from the external power supply;

measuring the response; and analyzing the measured response to determine a characteristic of the external power supply, wherein the control loop process is modified further based on the analyzed response.

12. The method of claim 11 wherein said analyzing the measured response comprises:

calculating a resonant frequency of the coupled external power supply based on the measured response.

13. The method of claim 12 wherein said control loop process is modified further by changing loop bandwidth of the process to avoid the calculated resonant frequency.

14. A power manager circuit comprising:

a current limit feedback control loop circuit to limit dc current in a power supply line;

a battery charger circuit to charge a battery using some of the dc current; and a controller circuit to monitor voltage on the power supply line and in response signal a change in loop frequency response of the control loop circuit without affecting the dc current limiting function of said control loop circuit.

15. The power manager circuit of claim 14 wherein the controller circuit is to signal that a predetermined load be applied to the power supply line, wherein the voltage being monitored is a response to the applied load.

16. The power manager circuit of claim 15 wherein the controller circuit is to calculate a resonant frequency based on the monitored voltage, and wherein the change is designed to distance a resonant frequency of the control loop circuit from the calculated one.

17. The portable device of claim 1, wherein the power manager modifying of the loop frequency response of the control loop modifies effective load presented to the external power supply.

18. The power manager circuit of claim 9, wherein the means for changing the loop frequency response of the current limiting means comprises means for modifying effective load presented to the power supply line.

19. The method of claim 10, wherein the modifying of the loop frequency response of the control loop modifies effective load presented to the external power supply.

20. The power manager circuit of claim 14, wherein the change in the loop frequency response of the control loop circuit modifies effective load presented to the power supply line.

* * * * *